(12) United States Patent
Maji

(10) Patent No.: US 12,319,842 B2
(45) Date of Patent: Jun. 3, 2025

(54) PRODUCTION PROCESS OF POLISHING STONE AND POLISHING STONE

(71) Applicant: DISCO CORPORATION, Tokyo (JP)

(72) Inventor: Ryogo Maji, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 375 days.

(21) Appl. No.: 17/330,579

(22) Filed: May 26, 2021

(65) Prior Publication Data

US 2021/0380843 A1 Dec. 9, 2021

(30) Foreign Application Priority Data

Jun. 8, 2020 (JP) .................... 2020-099136

(51) Int. Cl.
| C09G 1/02 | (2006.01) |
| C03B 19/06 | (2006.01) |
| C03B 19/09 | (2006.01) |
| C03C 11/00 | (2006.01) |

(52) U.S. Cl.
CPC ............. *C09G 1/02* (2013.01); *C03B 19/06* (2013.01); *C03B 19/09* (2013.01); *C03C 11/00* (2013.01); *C03C 2204/08* (2013.01)

(58) Field of Classification Search
None
See application file for complete search history.

(56) References Cited

U.S. PATENT DOCUMENTS

2018/0257199 A1    9/2018  Matsumori et al.

FOREIGN PATENT DOCUMENTS

| CN | 1194629 A | 9/1998 | |
| CN | 109153593 A | 1/2019 | |
| CN | 110683769 A | 1/2020 | |
| GB | 2420786 A * | 6/2006 | ............... B24B 1/00 |
| JP | 07507241 A | 12/1993 | |
| JP | 2000343438 A | 12/2000 | |
| JP | 2014037009 A | 2/2014 | |
| WO | 199324278 A | 12/1993 | |
| WO | 97/36835 A1 | 3/1997 | |

OTHER PUBLICATIONS

CN 109219501 machine translation, Goers et al., Pore Inducing Agent and a Porous Abrasive Body Using Same, Jan. 2019 (Year: 2019).*
JP 06157056 machine translation, Yagi et al. Porous Formed Material of Quartz Glass and Its Production, Jun. 1994 (Year: 1994).*

(Continued)

*Primary Examiner* — Queenie S Dehghan
(74) *Attorney, Agent, or Firm* — Greer Burns & Crain Ltd.

(57) ABSTRACT

A production process of a polishing stone includes a glass sphere feeding step of feeding glass spheres into a mold, and a firing step of heating the mold with the glass spheres filled therein at a temperature higher than a softening point and lower than a melting point of the glass spheres, thereby forming a glass block as the polishing stone. In the firing step, the heating is stopped with air bubbles still dispersed and remaining in interstices between the glass spheres in a dispersed manner.

12 Claims, 4 Drawing Sheets

(56) References Cited

OTHER PUBLICATIONS

JP 07-33457 machine translation, Nishiyama, Shinroku, Decorative Tile for Road Surface and its Production, Feb. 1995 (Year: 1995).*
DE 10 2016 221 856 machine translation, Baumeister et al., Process for the preparation of porous composite bodies, May 2018 (Year: 2018).*
Office Action issued in counterpart Singapore patent application No. 10202105487X, dated Aug. 26, 2022.
Office Action issued in counterpart Japanese patent application No. 2020-099136, dated Mar. 19, 2024.
Office Action issued in counterpart Taiwanese patent application No. 110117136, dated Aug. 27, 2024.
Office Action issued in counterpart Chinese Patent Application No. 202110613649.0, dated Mar. 30, 2025.

* cited by examiner

PRODUCTION PROCESS OF POLISHING STONE AND POLISHING STONE

BACKGROUND OF THE INVENTION

Field of the Invention

The present invention relates to a production process of a polishing stone useful in polishing a surface of a metal or ceramic, and also to a polishing stone useful in polishing a surface of a metal or ceramic.

Description of the Related Art

When a surface of a metal or ceramic is processed, fine irregularities and micro projections called burrs may be formed on the surface. As a polishing stone useful for removing such fine irregularities and burrs from the surface, Arkansas stone is known. Arkansas stone is used, for example, in cleaning a table base supporting a chuck table which holds a workpiece such as a semiconductor wafer, in a processing machine that processes the workpiece (see JP 2014-37009).

SUMMARY OF THE INVENTION

Arkansas stone is natural oil stone mined in Arkansas, USA. Arkansas stone is a mined natural product, and therefore is expensive and precious. Moreover, Arkansas stone tends to be uneven in characteristics and has large individual differences. There is hence a desire for a polishing stone usable as a substitute for Arkansas stone or a high-quality polishing stone having less variation than Arkansas stone.

The present invention therefore has as objects thereof the provision of a production process of a novel polishing stone usable in polishing a surface of a metal or ceramic and a novel polishing stone usable in polishing a surface of a metal or ceramic.

In accordance with an aspect of the present invention, there is provided a production process of a polishing stone, including a glass sphere feeding step of feeding glass spheres into a mold, and a firing step of heating the mold with the glass spheres filled therein at a temperature higher than a softening point and lower than a melting point of the glass spheres, thereby forming a glass block as the polishing stone. In the firing step, the heating is ended with air bubbles still dispersed and remaining in interstices between the glass spheres.

Preferably, the glass spheres may be formed of soda glass, feldspar or borosilicate glass.

Also, preferably, the glass block after performance of the firing step may have a surface roughness (Ra) of 0.2 μm or greater and 1.5 μm or smaller and a porosity of 2% or greater and 8% or smaller.

Also, preferably, the firing step may be performed for one hour or longer and two hours or shorter.

In accordance with another aspect of the present invention, there is provided a polishing stone for polishing a surface of a metal or ceramic, including a glass block having a surface roughness (Ra) of 0.2 μm or greater and 1.5 μm or smaller and a porosity of 2% or greater and 8% or smaller.

Preferably, the polishing stone may be free of abrasive grains.

In the production process according to one aspect of the present invention, the glass spheres are fed into the mold, and by the heating at the temperature higher than the softening point and lower than the melting point of the glass spheres, the glass block is formed as the polishing stone. Here, the heating is ended with the air bubbles still dispersed and remaining in the interstices between the glass spheres. Further, the polishing stone according to one aspect of the present invention has pores in an adequately dispersed state, and is even in characteristics and small in individual differences. The polishing stone can therefore be suitably used, as a substitute for Arkansas stone, in polishing the surface of the metal or ceramic.

According to aspects of the present invention, there are hence provided a production process of a novel polishing stone usable in polishing a surface of a metal or ceramic and a novel polishing stone usable in polishing the surface of the metal or ceramic.

The above and other objects, features and advantages of the present invention and the manner of realizing them will become more apparent, and the invention itself will best be understood from a study of the following description and appended claims with reference to the attached drawings illustrating a preferred embodiment of the invention.

DETAILED DESCRIPTION OF THE PREFERRED EMBODIMENT

With reference to the attached drawings, a description will be made regarding a production process of a polishing stone according to an embodiment of the present invention and a polishing stone. The polishing stone can be produced by the production process, and can be used as a substitute for Arkansas stone. When a surface of a metal or ceramic is processed, fine irregularities and micro projections called burrs may be formed on the surface. Arkansas polishing stone has conventionally been used as a polishing stone for removing such fine irregularities and burrs from the surface. When polishing a processed surface of a metal or ceramic, there are two contradictory requirements, one being to desirably ensure removal of fine irregularities and burrs on the surface, and the other to avoid excessive wear of the surface or damage to the surface through polishing. Arkansas stone is a relatively hard grinding stone formed of silica as a main component. Nonetheless, Arkansas stone contains pores (air bubbles) that can adequately hold oil, water, or the like employed as a lubricant during polishing, and therefore is suitable for the polishing of a surface of a metal or ceramic.

Figure 4:
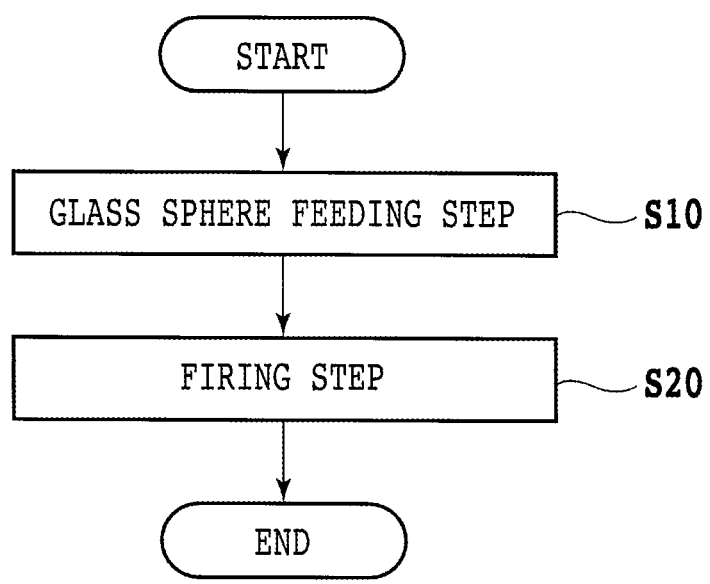
FIG. 4 is a flow chart illustrating a flow of the individual steps in the production process.

However, Arkansas stone is a mined natural product, is limited in reserve, and is precious. Moreover, Arkansas stone tends to have uneven quality and large individual differences. A need has hence arisen for an artificial polishing stone that can substitute for Arkansas stone. It has, however, been not easy to produce an artificial polishing stone of good characteristics formed of a hard material and containing pores adequately dispersed therein. The production method of a polishing stone according to this embodiment has made it possible to produce such a polishing stone of good characteristics. The individual steps of the production process will hereinafter be described. FIG. 4 is a flow chart illustrating a flow of the individual steps. In the production process, a glass sphere feeding step S10 is first performed to feed glass spheres into a mold, and a firing step S20 is then performed to heat the mold, so that a glass block is formed as a polishing stone.

Figure 1:
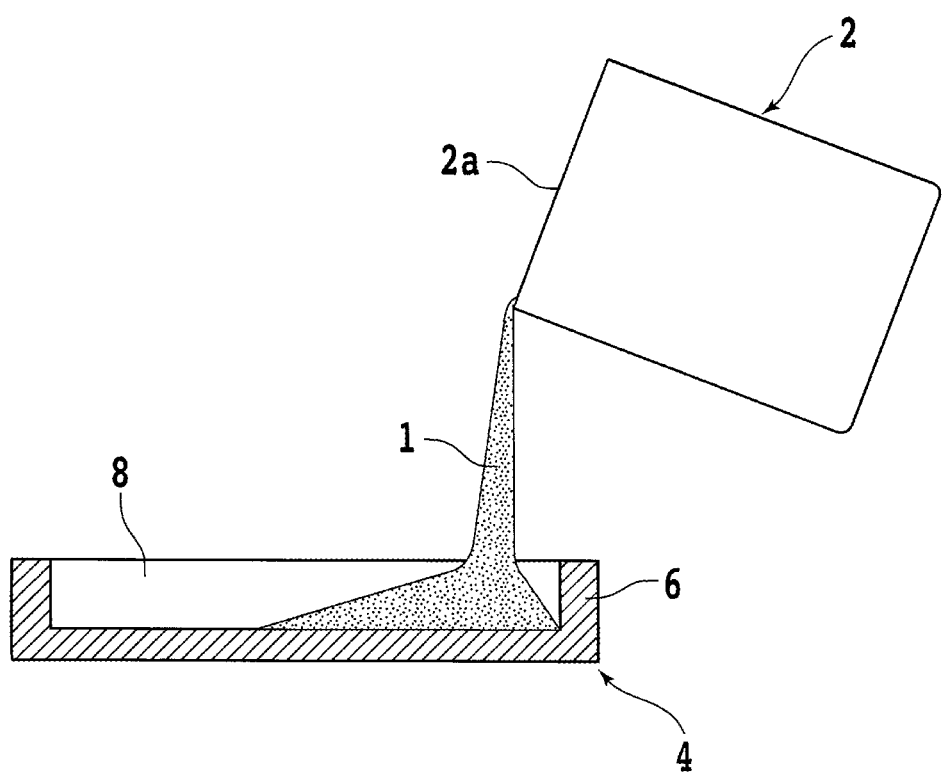
FIG. 1 is a cross-sectional view schematically illustrating a glass sphere feeding step in a production process of a polishing stone according to an embodiment of the present invention.

FIG. 1 is a cross-sectional view schematically illustrating the glass sphere feeding step S10. In FIG. 1, a container 2 with glass spheres 1 filled as a raw material for a glass block to be formed as a polishing stone therein is schematically illustrated in side elevation, and a mold 4 is schematically illustrated in cross-section. The mold 4 has a main body 6 formed of a ceramic or the like that can withstand a heating temperature in a firing step S20 to be described subsequently herein. Centrally in an upper wall of the main body 6, there is disposed a recessed cavity 8 into which the glass spheres 1 are poured. In the glass sphere feeding step S10, the glass spheres 1 are poured into the cavity 8 from a feed opening 2a of the container 2. The glass spheres 1 poured into the cavity 8 are fired at an elevated temperature into a glass block. The glass block so formed may be used, as it is, as a polishing stone, or may be shaped into a predetermined shape and then used as a polishing stone. The glass block has a shape reflecting the shape of the cavity 8. If the glass block is used, as it is, as a polishing stone, it is preferable that the cavity 8 of the mold 4 having a shape conforming to the shape of the polishing stone is selected to be used in the glass sphere feeding step S10.

The material of the glass spheres 1 is, for example, soda glass, feldspar, borosilicate glass, or the like. As the glass spheres 1, it is also preferred to use those having a sphere size of 50 to 150 µm in diameter. However, a fraction of the glass spheres 1 to be filled into the cavity 8 may have a sphere size outside the above-described range, insofar as a principal fraction of the glass spheres 1 has a sphere size within the above-described range. If the sphere size of the principal fraction of the glass spheres 1 is smaller than 50 µm in diameter, for example, the glass spheres 1 are difficult to handle, so that they are less likely to be filled into the cavity 8 of the mold 4. If the sphere size of the principal fraction of the glass spheres 1 is greater than 150 µm in diameter, on the other hand, pores of an adequate size cannot be formed with ease in an adequately dispersed state in the glass block to be formed. For example, pores are connected together in the glass block, leading to a possible situation where a lubricant such as oil or water supplied to the polishing stone during polishing of a workpiece may penetrate inside and may not be abundantly held on a surface at which the polishing stone remains in contact with the workpiece.

In the glass sphere feeding step S10, the glass spheres 1 are fed into the cavity 8 of the mold 4 in an amount corresponding to the volume of the glass block to be formed. Here, vibrations may preferably be applied to the mold 4 such that no superfluous space remains in the mold 4 while the glass spheres 1 filled in the cavity 8 are flattened at an upper surface thereof. For example, vibrations may preferably be applied to the mold 4 for a time shorter than one minute. Vibrations hence work as one of contributory factors for the production of a polishing stone of even quality.

Figure 2:
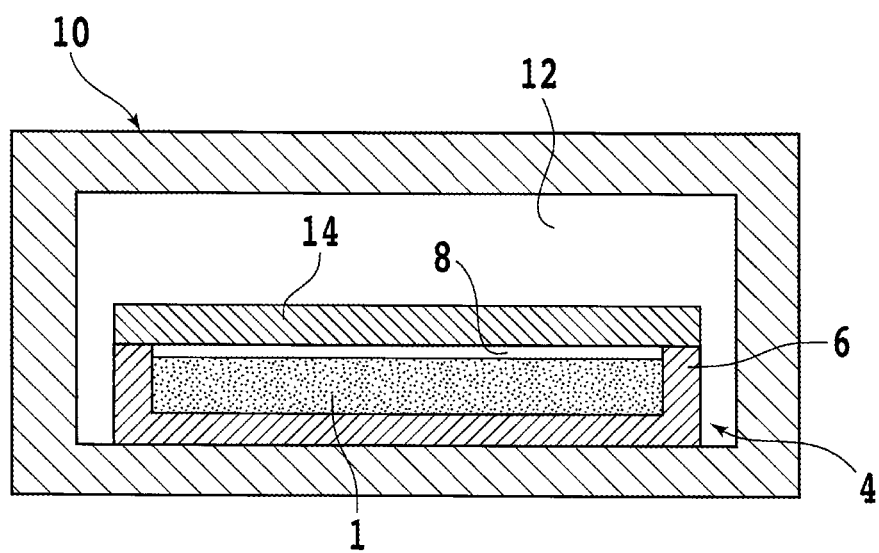
FIG. 2 is a cross-sectional view schematically illustrating a firing step in the production process.

Next to the glass sphere feeding step S10, the firing step S20 is performed. FIG. 2 is a cross-sectional view schematically illustrating the firing step S20. As illustrated in FIG. 2, the mold 4 with the glass spheres 1 filled in the cavity 8 is placed in an internal space 12 of a heating furnace 10, and is heated. When placed in the heating furnace 10, a lid 14 is mounted on an upper part of the mold 4 to close the cavity 8 of the mold 4. The lid 14 is formed, for example, of a similar material as the mold 4, and can withstand the heating temperature when the glass spheres 1 are fired.

The heating furnace 10 includes a heat source (not illustrated) such as an electric heating wire for heating the internal space 12 to a predetermined temperature. In the firing step S20, the mold 4 with the glass spheres 1 filled in the cavity 8 is heated at a temperature higher than the softening point and lower than the melting point of the glass spheres 1, whereby a glass block is formed as a polishing stone. Here, the term "the softening point" of the glass spheres 1 means a temperature at which the glass spheres 1 begin to deform when the temperature is progressively increased. The softening point differs depending on characteristics of the glass spheres 1 such as their material and molecular structure, and is a temperature lower than the melting point. In the firing step S20, the mold 4 is heated at a temperature higher than 720° C. and lower than 1,000° C. when the glass spheres 1 are formed of soda glass. Further, the mold 4 is heated at a temperature higher than 900° C. and lower than 1,350° C. when the glass spheres 1 are formed of feldspar. Furthermore, the mold 4 is heated at a temperature higher than 820° C. and lower than 1,250° C. when the glass spheres 1 are formed of borosilicate glass.

In the firing step S20, the heating is stopped with air bubbles still dispersed and remaining in interstices between the glass spheres 1. If the temperature of the glass spheres 1 exceeds the melting point, for example, the glass spheres 1 are melted to fill out the interstices between the glass spheres 1, so that the air bubbles are expelled from the interstices. If this is the case, any attempt to use the formed glass block as a polishing stone will fail to appropriately polish a workpiece because the polishing stone cannot hold a lubricant. Even if the temperature of the glass spheres 1 does not exceed the melting point, exposure of the glass spheres 1 to a temperature higher than the softening point for a long period of time will similarly expel the air bubbles from the interstices between the glass spheres 1. In the firing step S20, it is therefore preferred to heat the glass spheres 1 for a time equal to or longer than one hour and equal to or shorter than two hours. When the firing step S20 is performed, the glass block usable as the polishing stone is formed. Subsequently, the mold 4 is pulled out of the heating furnace 10, and the glass block is taken out of the mold 4.

Figure 3A:
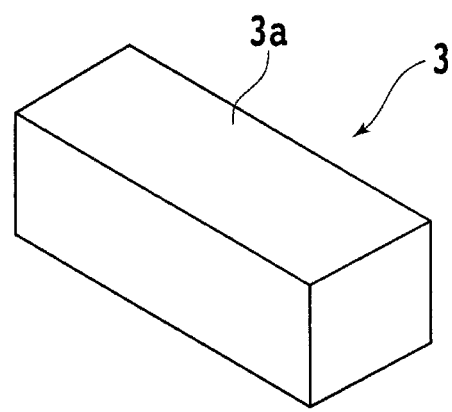
FIG. 3A is a perspective view schematically illustrating an example of a polishing stone.
Figure 3B:
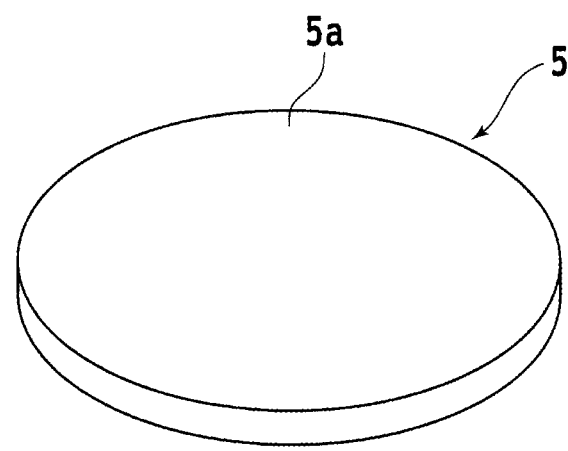
FIG. 3B is a perspective view schematically illustrating another example of the polishing stone.

FIG. 3A is a perspective view schematically illustrating a polishing stone 3 formed of a parallelepipedal glass block, and FIG. 3B is a perspective view schematically illustrating a polishing stone 5 formed of a disc-shaped glass block. According to the production process of a polishing stone of the embodiment, the polishing stone can be produced in a desired shape by changing the shape of the cavity 8 of the mold 4.

The glass blocks (polishing stones 3 and 5) after performance of the firing step S20 are measured for surface roughness (Ra) at surfaces 3a and 5a thereof. Typically, they are each found to have a surface roughness (Ra) of 0.2 µm or greater and 1.5 µm or smaller. The surfaces 3a and 5a are hence understood to be very flat. As no abrasive grains are mixed in the glass spheres 1 in the production method according to the embodiment, the polishing stones 3 and 5 are obtained free of abrasive grains. Accordingly, the surfaces 3a and 5a are provided with an extremely high degree of flatness, so that, even when surfaces of a metal or ceramic are polished by the polishing stones 3 and 5, damage such as scratches do not occur on the polished surfaces.

Further, the produced polishing stone 3 and 5 each preferably have a porosity of 2% or greater and 8% or smaller. Here, the term "porosity" means the fraction in terms of percentage of a volume occupied by pores over the total volume of the polishing stone 3 or 5. If the porosity of the polishing stone 3 or 5 is smaller than 2%, oil as a lubricant becomes hard to be adequately held. If the porosity of the polishing stone 3 or 5 is greater than 8%, on the other hand, the pores are connected together, thereby facilitating penetration of the lubricant into the polishing stone 3 or 5, so that the lubricant becomes hard to remain in as much an amount as needed on the surface. If the porosity is so high that many pores are exposed in the surface 3*a* or 5*a* of the polishing stone 3 or 5, burrs and the like which are formed on a surface of a workpiece tend to hit pore walls. The hitting of the pore walls by the burrs and the like tends to lead to occurrence of damage such as chippings on the workpiece at the points of the burrs and the like. Therefore, an excessively large number of pores can be a factor for a reduction in processing quality.

Note that, in the production process according to the embodiment, in order to further enhance the flatness of a surface of the formed glass block, a polishing step of polishing the surface of the formed glass block may be performed further after performance of the firing step S20. The produced polishing stones 3 and 5 may preferably be polished at the surface 3*a* and 5*a* as needed to ensure providing the polishing stones 3 and 5 with a flatness required corresponding to their use. Further, after performance of the firing step S20, a shaping step may be performed to shape the glass block into a polishing stone of a predetermined shape. In the shaping step, the glass block is shaped, for example, by cutting it with an annular cutting blade or grinding it with a disc-shaped grinding stone. By such shaping, polishing stones of various shapes can be produced according to use. When a workpiece of a metal, ceramic, or the like is polished using the produced polishing stone, resultant polishing debris and the like accumulate on the surface of the polishing stone, and may hence cause clogging. If this is the case, the polishing ability of the polishing stone can be restored by polishing or grinding the surface of the polishing stone to remove the clogged portion and to cause a fresh surface to be exposed.

As described above, the production process of a polishing stone of the embodiment can produce the polishing stones 3 and 5 that can be used as substitutes for Arkansas stone. The polishing stones 3 and 5 so formed have a high surface flatness and an adequate porosity, and therefore can be suitably used in polishing processed surfaces of a metal or ceramic. Moreover, different from Arkansas stone as a mined natural product, the produced polishing stones 3 and 5 are even in quality, and have small variation in individual differences. In particular, use of soda glass spheres as the glass spheres 1 to be fed into the mold 4 in the glass sphere feeding step S10 allows to keep the heating temperature of the mold 4 relatively low in the firing step S20, so that the polishing stones 3 and 5 can be produced easily at low price, and moreover, their properties become stabler.

In the above-described embodiment, a description is made regarding the use of the polishing stones 3 and 5 in the polishing of the surfaces of the metal or ceramic, although an aspect of the present invention should not be limited to this. Described specifically, the polishing stones 3 and 5 may be used for other application purposes. In the above-described embodiment, a description is also made regarding the case in which, in the glass sphere feeding step S10, vibrations are applied to the mold to expel air bubbles and to flatten the glass spheres 1 at the upper surface thereof, although an aspect of the present invention should not be limited to this. For example, the upper surface of the glass spheres 1 may be flattened by another method, or may be flattened by a jig having a planar shape.

The present invention is not limited to the details of the above-described preferred embodiment. The scope of the invention is defined by the appended claims and all changes and modifications as fall within the equivalence of the scope of the claims are therefore to be embraced by the invention.

What is claimed is:

1. A production process of a polishing stone, comprising:
   a glass sphere feeding step of feeding only glass spheres into a mold; and
   a firing step of heating the mold with the glass spheres filled therein at a temperature higher than a softening point and lower than a melting point of the glass spheres, thereby forming a glass block as the polishing stone;
   wherein, in the firing step, the heating is ended with air bubbles still dispersed and remaining in interstices between the glass spheres;
   wherein the glass block after performance of the firing step has a surface roughness (Ra) of 0.2 µm or greater and 1.5 µm or smaller and a porosity of 2% or greater and 8% or smaller; and
   wherein the firing step is performed for a period of time such that the heating is ended before the air bubbles are expelled.

2. The production process of a polishing stone according to claim 1, wherein the glass spheres are formed of soda glass, feldspar, or borosilicate glass.

3. The production process of a polishing stone according to claim 1, wherein the firing step is performed for one hour or longer and two hours or shorter.

4. The production process of a polishing stone according to claim 1, wherein no abrasive grains are mixed in with the glass spheres and the polishing stone is free of abrasive grains.

5. The production process of a polishing stone according to claim 1, wherein the glass spheres have a sphere size between 50 and 150 µm in diameter.

6. The production process of a polishing stone according to claim 1, further comprising:
   a shaping step of shaping the glass block into a polishing stone of a predetermined shape by cutting it with an annular cutting blade or grinding it with a disc-shaped grinding stone.

7. The production process of a polishing stone according to claim 1, wherein, in the glass sphere feeding step, vibrations are applied to the mold to expel air bubbles and to flatten the glass spheres at the upper surface thereof.

8. The production process of a polishing stone according to claim 1, wherein, after the glass sphere feeding step and before the firing step, a lid is mounted on an upper part of the mold to close a cavity formed by the mold.

9. The production process of a polishing stone according to claim 1, wherein pores formed in the glass block during the firing step are not connected.

10. The production process of a polishing stone according to claim 1, wherein, in the firing step, the mold is heated at a temperature higher than 720° C. and lower than 1,000° C. when the glass spheres are formed of soda glass.

11. The production process of a polishing stone according to claim 1, wherein, in the firing step, the mold is heated at a temperature higher than 900° C. and lower than 1,350° C. when the glass spheres are formed of feldspar.

12. The production process of a polishing stone according to claim 1, wherein, in the firing step, the mold is heated at a temperature higher than 820° C. and lower than 1,250° C. when the glass spheres are formed of borosilicate glass.

* * * * *